(12) United States Patent
Galloway et al.

(10) Patent No.: US 6,282,052 B1
(45) Date of Patent: Aug. 28, 2001

(54) METHOD AND APPARATUS FOR DETERMINATION OF DISC DRIVE STRUCTURAL RESPONSE DURING TYPICAL OPERATIONS

(75) Inventors: Paul A. Galloway, Prior Lake; Kyle K. Eddy, Minneapolis, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/186,735

(22) Filed: Nov. 4, 1998

Related U.S. Application Data
(60) Provisional application No. 60/072,553, filed on Jan. 26, 1998.

(51) Int. Cl.$^7$ .................................................. G11B 5/596
(52) U.S. Cl. ............................ 360/78.09; 360/78.04; 360/77.04; 360/75
(58) Field of Search ........................ 360/77.04, 78.09, 360/78.04, 75; 318/560, 561

(56) References Cited

U.S. PATENT DOCUMENTS

| | | | |
|---|---|---|---|
| 5,305,160 | * | 4/1994 | Funches et al. .................. 360/78.07 |
| 5,339,206 | * | 8/1994 | Takahashi ............................... 360/75 |
| 5,369,345 | * | 11/1994 | Phan et al. ............................ 318/561 |
| 5,654,841 | * | 8/1997 | Hobson et al. ......................... 360/75 |
| 6,072,654 | * | 6/2000 | Eddy .................................. 360/77.04 |

\* cited by examiner

*Primary Examiner*—David Hudspeth
*Assistant Examiner*—Dan I. Davidson
(74) *Attorney, Agent, or Firm*—Theodore M. Magee; Westman, Champlin & Kelly, P.A.

(57) ABSTRACT

A method for determining servo loop gain of a servo loop in a disc drive includes performing a plurality of seek operations, each seek operation moving a head in a disc drive across a plurality of tracks on the disc. Afterwards, the head is settled over a radial position on a track and a signal is injected into the servo loop at the first frequency. At least two values generated by portions of the servo loop are measured to determine a servo loop gain.

19 Claims, 7 Drawing Sheets

METHOD AND APPARATUS FOR DETERMINATION OF DISC DRIVE STRUCTURAL RESPONSE DURING TYPICAL OPERATIONS

REFERENCE TO RELATED APPLICATIONS

The present application claims priority from U.S. provisional patent application 60/072,553 entitled DETERMINATION OF DISC DRIVE STRUCTURAL RESPONSE DURING TYPICAL OPERATION, filed on Jan. 26, 1998.

FIELD OF THE INVENTION

The present invention relates to storage devices. In particular, the present invention relates to servo loops in storage devices.

BACKGROUND OF THE INVENTION

Storage devices, such as disc drives, typically use servo systems to position a read or write head over a recording track where digital information is stored. Like all mechanical structures, the servo system has resonant frequencies at which it physically resonates. When the servo system resonates it can become unstable or unpredictable if the resonant frequencies fall within range of operating frequencies of the servo system, which is the range of frequencies at which the servo system can move a head back and forth across the disc.

During design and/or manufacturer of current storage devices, the gain of the servo loop system is measured to determine resonant frequencies of the servo loop and the relative magnitudes of the servo loop gain at those frequencies. Typically, the servo loop gain's magnitude will have localized peaks near resonant frequencies. The magnitude of these peaks, as well as their relationship to the phase response of the servo loop, determine whether the servo loop is unstable.

Currently servo loop gain determinations are made by positioning the head at a radial position along a track and introducing noise signals of different frequencies into the servo loop system. The response of the servo loop at those frequencies is then measured to determine the open loop gain and phase response.

Unfortunately, such measurement systems are less than ideal and do not accurately describe the servo loop gain distribution of a disc drive during normal operations.

The present invention addresses these and other problems, and offers other advantages over the prior art.

SUMMARY OF THE INVENTION

A method for determining servo loop gain of a servo loop in a disc drive includes performing a plurality of seek operations, each seek operation moving a head in a disc drive across a plurality of tracks on the disc. Afterwards, the head is settled over a radial position on a track and a signal is injected into the servo loop at the first frequency. At least two values generated by portions of the servo loop are measured to determine a servo loop gain.

DETAILED DESCRIPTION OF THE PREFERRED EMBODIMENTS

Figure 1:
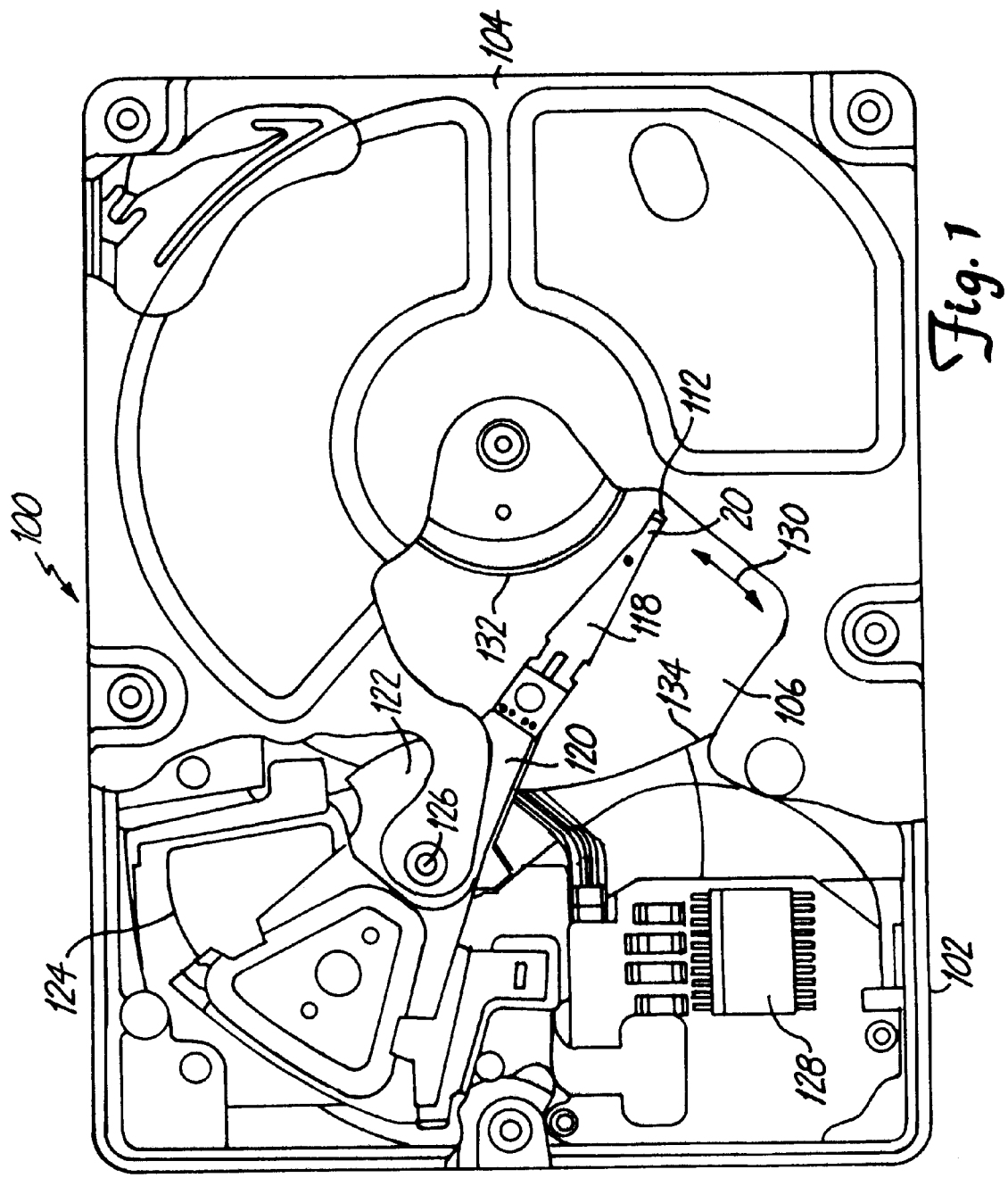
FIG. 1 is a plan view of a disc drive of the present invention.

FIG. 1 is a plan view of a disc drive 100 that includes a housing with a base plate 102 and a top cover 104 (sections of top cover 104 are removed for clarity). Disc drive 100 further includes a disc pack 106, which is mounted on a spindle motor (not shown). Disc pack 106 can include a plurality of individual discs which are mounted for co-rotation about a central axis. Each disc surface has an associated head gimbal assembly (HGA) 112 which is mounted to disc drive 100 for communication with the disc surface. Each HGA 112 includes a gimbal and a slider, which carries one or more read and write heads. Each HGA 112 is supported by a suspension 118 which is in turn attached to a track accessing arm 120 known generally as a fixture, of an actuator assembly 122.

Actuator assembly 122 is rotated about a shaft 126 by a voice coil motor 124, which is controlled by servo control circuitry within internal circuit 128. HGA 112 travels in an accurate path 130 between a disc inner diameter 132 and a disc outer diameter 134. When the head is properly positioned, write circuitry within internal circuitry 128 encodes data for storage on the disc and sends an encoded signal to the head in HGA 112, which writes the information to the disc. At other times, the read head in HGA 112 reads stored information from the disc and provides a recovered signal to detector circuitry and decoder circuitry within internal circuitry 128 to produce a recovered data signal.

Figure 2:
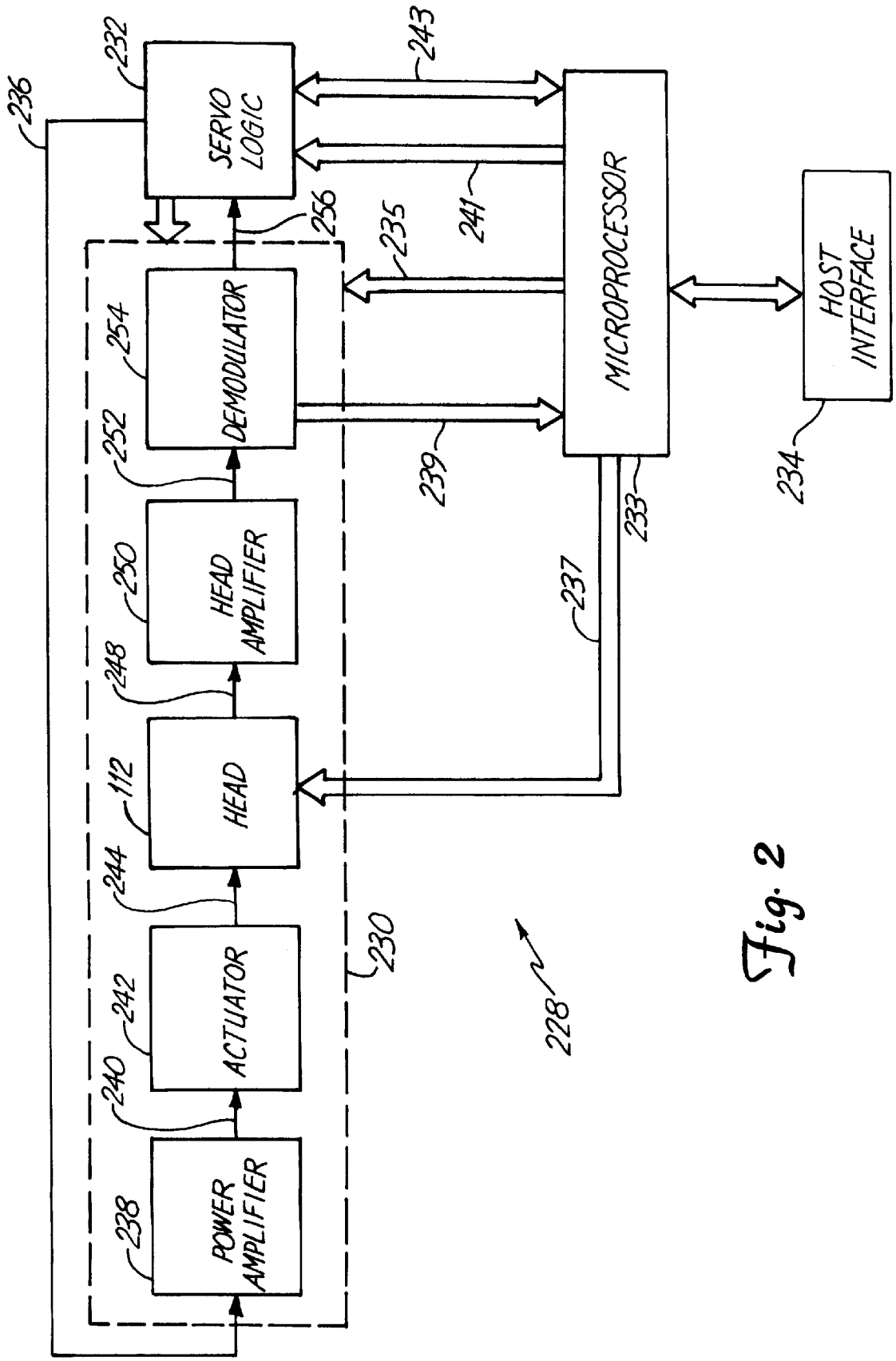
FIG. 2 is a block diagram of a servo loop of the present invention.

FIG. 2 is a block diagram of an information storage device 228, such as magnetic disc drive 100 of FIG. 1. Storage device 228 includes three main components: plant 230, servo logic 232, and microprocessor 233. Microprocessor 233 communications with a host (not shown) through a host interface 234. Microprocessor 233 controls the reading and writing of information to a disc based on instructions received from the host. Specifically, microprocessor 233 applies control signals through control lines 235 to plant 230 to control various functions of plant 230 including selection of a head, strength of a write current, read sensitivity and mode of operation (read, write, or track seek). In addition, microprocessor 233 provides write data along data bus 237. The recovered data is provided to the host through host interface 234.

Microprocessor 233 controls the movement of head 112 over the disc through servo logic 232, which is connected to microprocessor 233 through an address bus 241 and a bidirectional data bus 243. Using address bus 241 and data bus 243, microprocessor 233 is able to store a desired location for the head in a memory location within servo logic 232. This memory location is accessed by servo logic 232, which issues a current command 236 to plant 230 based upon the stored value and the current position of the head. Microprocessor 233 is also able to retrieve head position information stored in servo logic 232's memory locations using address bus 241 and data bus 243.

Within plant 230, current command 236 is received by power amplifier 238, which converts the voltage of current command 236 into a current signal 240. Current signal 240 is provided to and controls an actuator 242, which includes voice coil motor 134 of FIG. 1 that is driven by, and accelerates at a rate determined by, the current of current signal 240. Actuator 242 translates the current of current signal 240 into mechanical movement 244, which moves head 112 relative to the medium.

Head 112 detects data and servo patterns embedded within the medium as it moves relative to the medium. The servo patterns contain information about the position of the head relative to the medium and cause the head to produce a low-level signal 248 that contains encoded position information. A head amplifier 250 amplifies the low-level signal 248 to produce amplified signal 252, which is less susceptible to noise and which is easier to decode. Amplified signal 252 is input to demodulator 254, which interprets the encoded head signal and supplies a demodulator position measurement 256 to servo logic 232, and data to microprocessor 233 along data line 239.

Servo logic 232 applies demodulator position measurement 256 to a linearity table that relates the demodulator position measurement 256 to the actual position of the head. Thus, servo logic 232 can determine the position of head 112 and issue a new current command 236 based on this position and the desired position set by microprocessor 233.

There are two basic modes of operation for storage device 228. In one mode, known as track seeking, microprocessor 233 instructs servo logic 232 to move the head across the medium to a new track. In the second mode of operation, known as track following, microprocessor 233 instructs servo logic 232 to keep the head located over a position within a track. Track following is not a completely passive mode since servo logic 232 must move the head in order to keep it steady relative to a track on the medium. This movement is necessary because the tracks include irregularities and servo logic 232 must move head 112 in order to follow these irregularities. During track following, the head is kept in position using the servo loop formed between plant 230 and servo logic 232. Specifically, as head 112 moves off position, low level signal 248 begins to change because the head is reading different parts of the servo patterns embedded in the medium. This change in low level signal 248 causes similar changes in amplified signal 252 and position measurement 256. In response to the change in position measurement 256, servo logic 232 changes current command 236 so that head 112 moves toward its original position over the track.

The servo loop described above has a frequency dependent response to irregularities in the track in the sense that its ability to respond to irregularities in the track decreases as the frequencies of those irregularities increases. In this sense, the irregularities of the track can by thought of as an input signal to the servo loop. For certain types of head 112, specifically magnetoresistive heads, the frequency response of the servo loop changes as the position of head 112 changes within a track. Thus, the head will respond faster to track irregularities in different parts of a track.

To determine the frequency response of the servo loop, an embodiment of the present invention inserts disturbance signals into the servo loop to see how the servo loop responds to different frequencies. In one embodiment of the present invention, shown in FIG. 3, these disturbances are added to the servo loop by a personal computer that is connected to the information storage device for this purpose. The elements of FIG. 3 that are found in FIG. 2 are referred to using the same characters used in FIG. 2.

Figure 3:
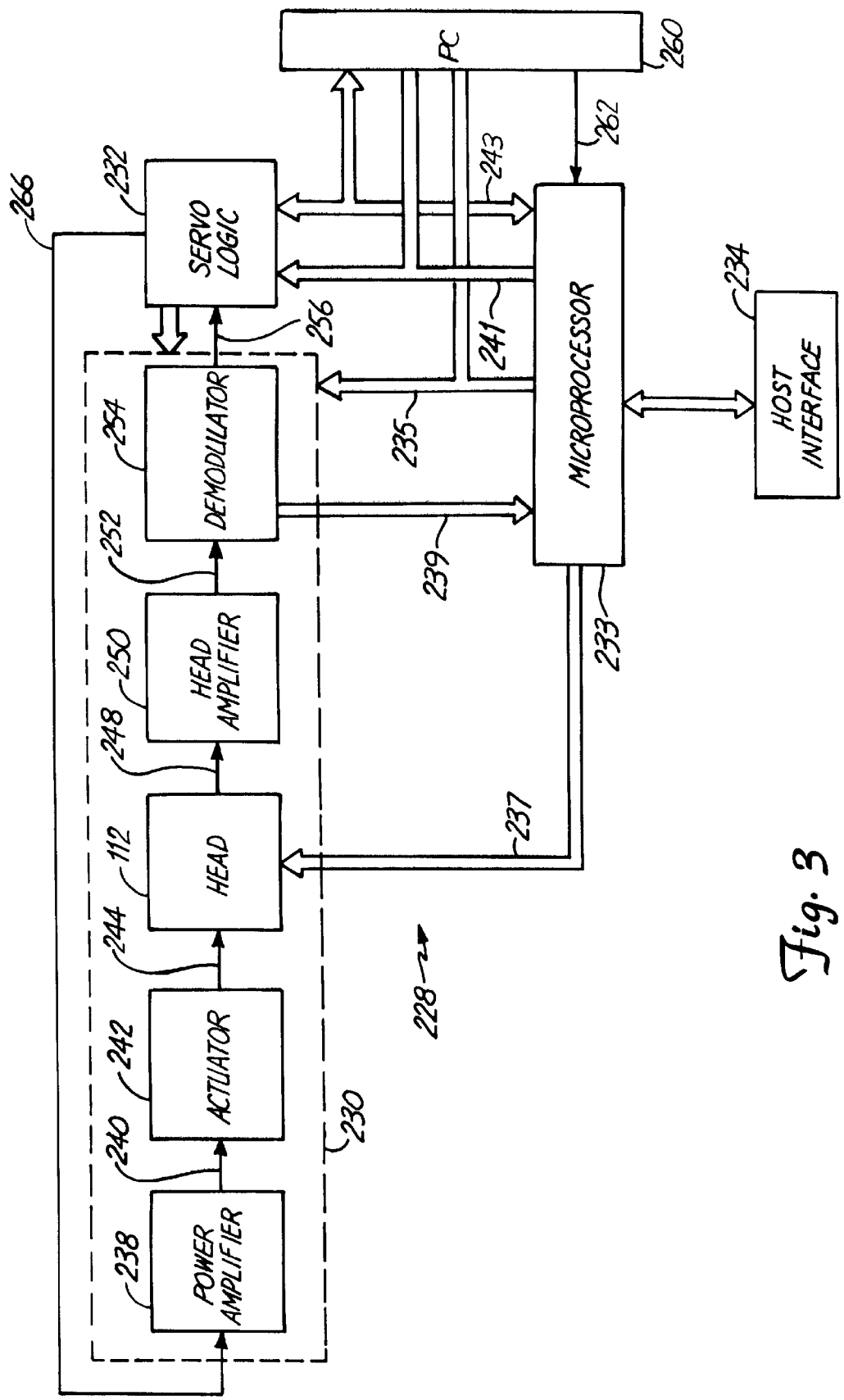
FIG. 3 is a block diagram of a servo loop of the present invention connected to a servo interface of the present invention.

In FIG. 3, personal computer (PC) 260 is added to information storage device 228 of FIG. 2 and is connected to address bus 241 and bi-directional data bus 243 between microprocessor 233 and servo logic 232. Through these connections, PC 260 is able to read values stored in servo logic 232, including the value of position measurement 256. PC 260 is also able to read the value of a signal that is equivalent to current command 236 of FIG. 2. In FIG. 3, the signal referred to as current command 236 in FIG. 2 is not directly output to power amplifier 238. Instead, the value of this signal is stored in a memory location within servo logic 232 and is accessed by PC 260. During frequency testing, PC 260 combines the stored current command value with the value of a sinusoidal disturbance signal to produce a net current command value, which is then stored in servo logic 232. A series of these values is used to create net current command 266, which is output by servo logic 232 to power amplifier 238.

In preferred embodiments, address bus 241 and data bus 243 are each 8-bit buses and servo logic 232 includes a 16-bit digital signal processor. Therefore, in order to retrieve or store values, PC 260 must perform two separate operations. For instance, the position measurement value stored in servo logic 232 is a 16-bit value, so PC 260 must perform two separate 8-bit read functions in order to retrieve a single position measurement from servo logic 232.

PC 260 is also connected to plant 230 through control lines 235 and is able to control plant 230 in a manner similar to the way in which microprocessor 233 controls plant 230. In order to avoid a conflict with microprocessor 233 while PC 260 is operating, PC 260 issues a "sleep" command to microprocessor 233 along a disable line 262. The "sleep" command insures that microprocessor 233 will not issue commands to plant 230 while PC 260 is interacting with storage device 228.

PC 260 includes an input/output card that allows a standard personal computer to communicate with the servo system. The input/output card converts addresses generated by PC 260 into the addressing scheme used by servo logic 232 and plant 230. Preferably, the card allows a single eight-bit value to be written to or read from servo logic 232 in less than two microseconds.

Figure 4:
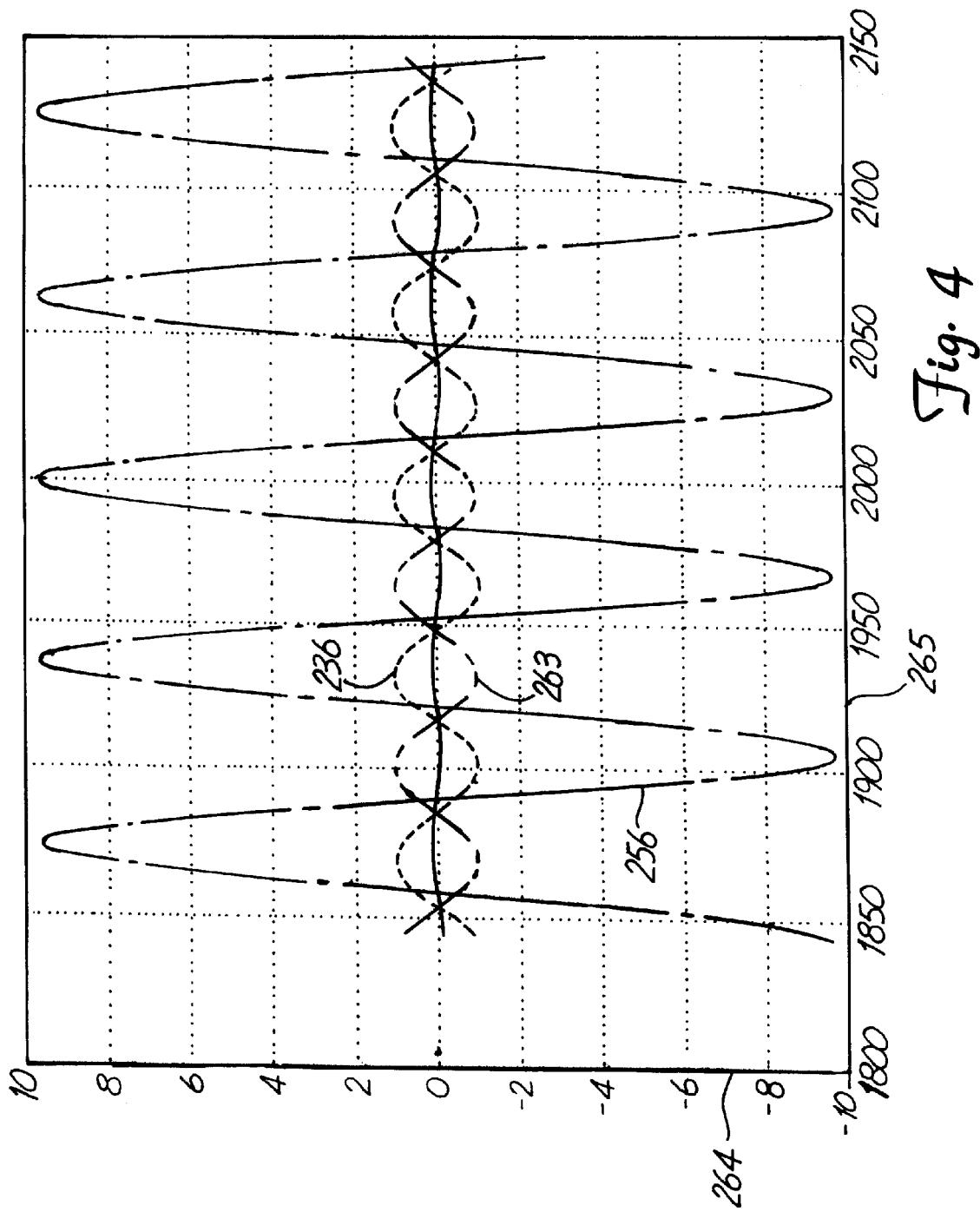
FIG. 4 is a graph of signals in the servo loop of FIG. 3.

FIG. 4 is a composite graph of four signals in the servo loop formed by plant 230, servo logic 232, and PC 260 of FIG. 3. The signals represent the response of the servo loop to a fixed sinusoidal disturbance signal 263. The magnitude of the signals have been scaled so that the vertical axis, 264, is in arbitrary units. The scaling performed on each signal is designed to permit a comparison between the signals of FIGS. 4 and 5, which show the same signals at different frequencies. The horizontal axis of FIG. 4 is time, 265, measured in seconds.

In FIG. 4, disturbance signal 263 is the sinusoidal signal that PC 260 combines with current command 236 to produce net current command 266, which is output to power amplifier 238. In FIG. 4, all three signals have a frequency of 0.1 radians per second. Current command 236 has the same amplitude as disturbance signal 263 but is slightly more than 180° out of phase with disturbance signal 263. Net current command 266 has a small magnitude that causes the head to move and creates a sinusoidal demodulator position measurement 256. This in turn creates current command 236 through servo logic 232.

Since current command 236 can be thought of as the servo loop's response to net current command 266, the gain of the servo loop can be measured as the ratio of the magnitude of current command 236 to the magnitude of net current command 266. As can be seen from FIG. 4, at this low frequency, the ratio of current command 236 to net current command 266 is greater than 1.

Figure 5:
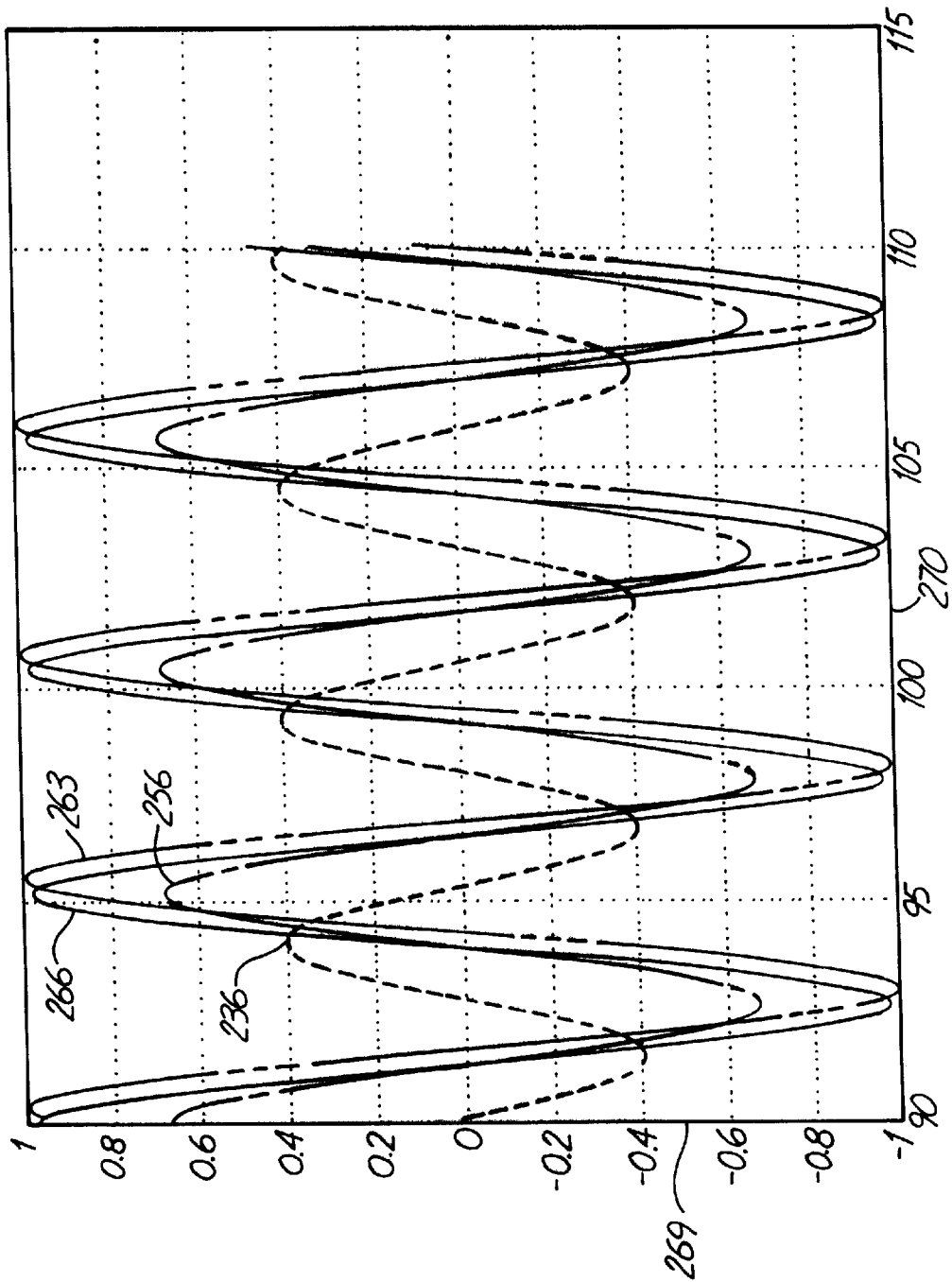
FIG. 5 is a graph of signals in the servo loop of FIG. 3.

FIG. 5 shows a composite graph of the four signals of FIG. 4 but with disturbance signal 263 at a higher frequency. Specifically, disturbance signal 263 has a frequency of 1.2 radians per second in FIG. 5. As in FIG. 4, the vertical axis, 269, is in arbitrary units and the horizontal axis represents time, 270, in seconds. The magnitude of disturbance signal 263 in FIG. 5 is the same as in FIG. 4. The frequency of disturbance signal 263 is such that the servo loop cannot respond quickly enough to compensate for the signal. As such, current command 236 is smaller in FIG. 5 than in FIG. 4 and net current command 266 is larger in FIG. 5 than in FIG. 4. As such, the ratio of current command 236 to net current command 266 is much smaller in FIG. 5, and in fact is less than 1 in FIG. 5. Thus, as the frequency of the disturbance signal increases, the gain of the servo loop generally decreases.

Figure 6:
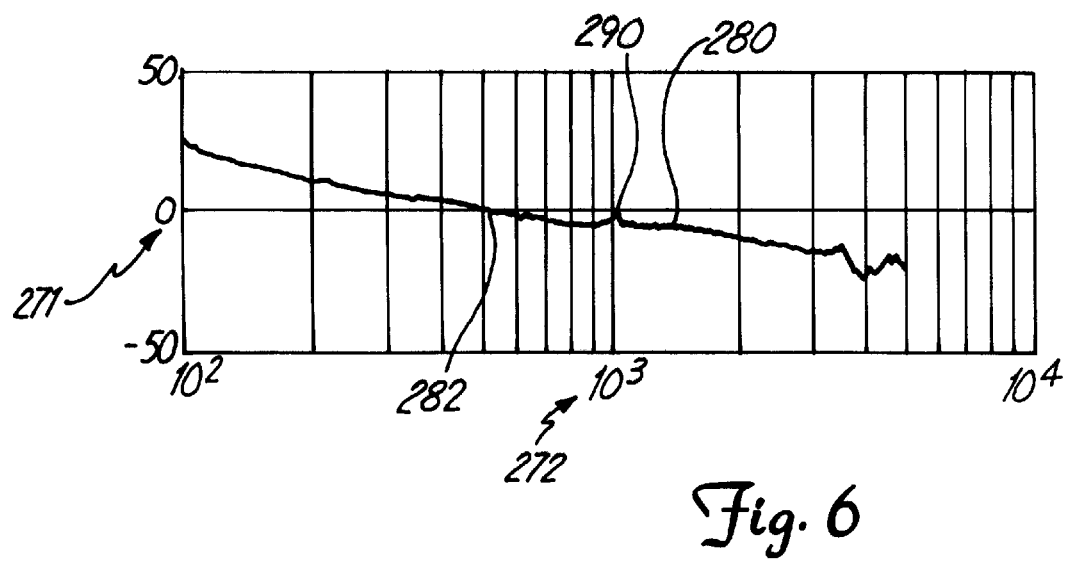
FIG. 6 is a graph of a servo loop gain distribution.

The decreasing gain is shown more clearly in FIG. 6, which is a graph of the open loop frequency response of a servo loop such as the one shown in FIG. 3. In FIG. 6, line 280 denotes the magnitude of the gain as a function of frequency, 272, measured in Hertz (1/sec), denoted as Hz along the horizontal axis. The magnitude of the gain, 271, shown on the vertical axis in FIG. 6 is measured in decibels (dB) such that a gain of magnitude 1 is depicted as a gain of 0 dB. Point 282 is the point at which the open loop gain crosses 0 dB. The frequency associated with point 282 is known as the crossover frequency for the servo loop.

FIG. 6 also includes a resonating portion 290 where the open loop gain comes to a localized peak. This peak is caused by the servo loop resonating at a frequency located at the center of portion 290. By examining the location and magnitude of resonant peaks such as resonant portion 290, it is possible to determine if a disc drive is stable or unstable and to determine whether the disc drive will have enough mechanical predictability to perform at the frequencies of interest. Such examinations, known generally as qualifying the disc drive, can be performed during the design process of the disc drive or during manufacturing of disc drives.

Under the present invention, the inventors have determined that the resonant frequencies associated with resonant portions such as resonant portion 290 of FIG. 6, shift as the disc drive is operated. Specifically, the present invention recognizes that as actuator assembly 122 of FIG. 1 is moved back and forth across disc 106, bearings surrounding shaft 126 heat up and fluids surrounding the bearings become less viscous. Heat is also produced by the current passing through voice coil motor 124. These heat sources raise the temperature of the disc drive and affect the vibrational modes of head gimbal assembly 112, suspension 118, and track accessing arm 120 of FIG. 1. This changes the resonant frequencies of the disc drive and changes the servo loop open gain response from that shown in FIG. 6.

As discussed above, prior art systems have determined resonant frequencies of servo loops by positioning a head at a single position over a track and injecting a plurality of signals of different frequencies into the servo system to determine how the servo system responds. Some prior art systems have gone as far as to place the disc drive into an environment chamber that changes the temperature and the humidity of the disc drive while determining the servo loop response. Although such prior art systems change the temperature of the disc drive, they do not simulate the actual operating states of the disc drive because they do not move actuator assembly 122 across the disc sufficiently to mimic operating conditions for the disc drive. Under the present invention, actuator assembly 122 is moved across the disc several times by performing several high powered seek operations that move the head from a track near the outer diameter of the disc to a track near the inner diameter of the disc repeatedly.

Figure 7:
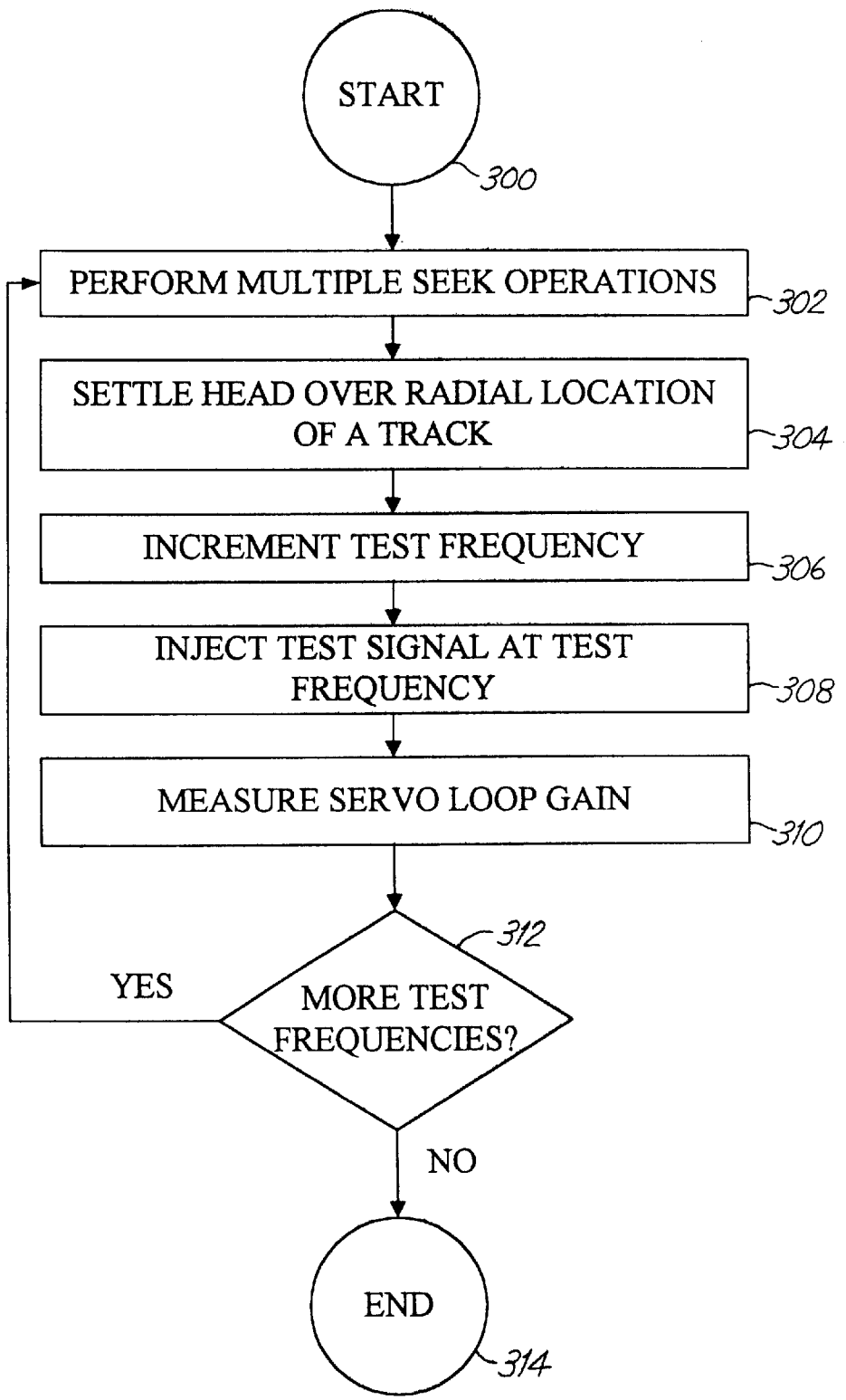
FIG. 7 is a flow diagram of a method of one embodiment of the present invention.

The specific methods for determining the open loop gain of a disc drive under the present invention is shown in FIG. 7. The method begins at step 300 and continues at step 302 where multiple seek operations are performed. In each of these seek operations, actuator assembly 122 is rotated about shaft 126 by voice coil motor 124 multiple times causing head 112 to move back and forth across disc 106. In embodiments of the present invention where the resonant frequencies for the disc drive are being determined under conditions that mimic normal operation of the disc drive, approximately 100 seeks are performed. In embodiments of the present invention that determine the resonant frequencies for the disc drive under extreme operating conditions, up to 500 seek operations are performed.

After the seek operations have been performed, the head is settled over a radial location of a track on the disc in step 304. For example, the radial location can be the center of a circumferential track around the disc.

In step 306, the frequency of the test signal by that is to be injected into the servo loop is incremented. If this is the first test frequency, the test frequency is incremented from zero. The amount by which the test frequency is incremented is determined by the range of frequencies over which the disc drive is being tested and the amount of time that the tester is willing to spend testing the disc drive. Smaller increments between the test frequencies result in a longer testing time because more test signals must be introduced into the servo loop to cover the testing range.

At state 308, a test signal at the current test frequency is injected into the servo loop. This is accomplished using the technique described above in connection with FIG. 3. At step 310, the servo loop gain at the test frequency is measured using the techniques described above in connection with FIG. 3.

At step 312, the method determines if there are more test frequencies to be applied to the servo loop. If there are more test frequencies, the method returns to step 302 where multiple seek operations are once again performed. If there are no more test frequencies, the method ends at step 314.

By performing multiple seek operations between each frequency point in the servo loop gain, the present invention is able to mimic operating conditions for the disc drive and to provide a more accurate depiction of the servo loop gain of a disc drive. This allows designers to produce more stable disc drives and allows manufacturers to better identify disc drives that will become unstable in use.

In summary, the present invention includes a method for determining a servo loop gain 280 of a servo loop 230, 232 in a disc drive 100. The method includes performing a plurality of seek operations 302, where each seek operation moves a head 112 across a plurality of tracks on a disc 106. The head 112 is then settled over a radial position on a track in a step 304. In a step 308, a signal 263 is injected into servo loop 230, 232 at a first frequency. In a step 310, at least two values 266, 236 that are generated by portions of the servo loop 230, 232 are measured to determine a first servo loop gain.

In other embodiments of the invention, a disc drive 100 having a servo loop 230, 232 that includes a head 112 is qualified through a method that begins by selecting a plurality of test frequencies. For each test frequency, the head 112 is moved rapidly over a disc 106 to a plurality of positions. The head is then maintained in a radial position within a track on the disc 106. A signal 263 is injected into the servo loop 230, 232 at a test frequency. A servo loop gain 280 is then determined. The servo loop gains at each test frequency are then examined to determine if the disc drive is within specifications.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo loop gain measurement system while maintaining substantially the same functionality without departing from the scope and spirit of the present invention. In addition, although the preferred embodiment described herein is directed to a servo loop for a disc drive system, it will be appreciated by those skilled in the art that the teachings of the present invention can be applied to other systems, like tape storage systems, without departing from the scope and spirit of the present invention.

What is claimed is:

1. A method for determining servo loop gain of a servo loop in a disc drive, the method comprising steps of:
    (a) performing a plurality of seek operations, each seek operation moving a head in a disc drive across a plurality of tracks on the disc;
    (b) settling the head over a radial position on a track;
    (c) injecting a signal into the servo loop at a first frequency; and
    (d) measuring at least two values generated by portions of the servo loop to determine a first servo loop gain.

2. The method of claim 1 further comprising further steps of:
    (e) performing a second plurality of seek operations, each seek operation moving a head in a disc drive across a plurality of tracks on the disc;
    (f) settling the head over a radial position on a track;
    (g) injecting a second signal into the servo loop at a second frequency; and
    (h) measuring at least two values generated by portions of the servo loop to determine a second servo loop gain.

3. The method of claim 2 further comprising further steps of:
    (i) determining the resonant frequency of the servo loop based in part on the first servo loop gain and the second servo loop gain.

4. The method of claim 1 wherein the number of seek operations is sufficient to change the temperature of a portion of the disc drive.

5. The method of claim 4 wherein the number of seek operations is sufficient to change the temperature of a bearing assembly in the disc drive.

6. The method of claim 5 wherein the number of seek operations is sufficient to change a viscosity of a fluid proximate a bearing assembly in the disc drive.

7. The method of claim 1 wherein the number of seek operations is sufficient to change a resonant frequency of the disc drive.

8. The method of claim 2 further comprising determining a plurality of additional servo loop gains at a plurality of additional frequencies, for each servo loop gain the method comprising steps of:
    (a) performing a plurality of seek operations, each seek operation moving a head in a disc drive across a plurality of tracks on the disc;
    (b) settling the head over a radial position on a track;
    (c) injecting a signal into the servo loop at one of the plurality of frequencies; and
    (d) measuring at least two values generated by portions of the servo loop to determine one of the plurality of servo loop gains.

9. The method of claim 8 wherein determining one of the plurality of servo loop gains comprises dividing a value generated by one portion of the servo loop by a value generated by another portion of the servo loop.

10. A method of qualifying a disc drive having a servo loop that includes a head, the method comprising steps of:
    (a) selecting a plurality of test frequencies;
    (b) for each test frequency, performing steps of:
        (1) moving the head rapidly over the disc to a plurality of positions;
        (2) maintaining the head in a radial position within a track on the disc;
        (3) injecting a signal at the test frequency;
        (4) determining the servo loop gain;
    (c) examining the servo loop gains at each test frequency to determine if the disc drive is within specifications.

11. The method of claim 10 wherein determining if the disc drive is within specifications comprises identifying a characteristic of the servo loop related to a resonant frequency of the servo loop based on the servo loop gains.

12. The method of claim 11 wherein the characteristic of the servo loop is the frequency of at least one resonant frequency of the servo loop.

13. The method of claim 11 wherein the characteristic of the servo loop is the magnitude of the servo loop gain at at least one resonant frequency of the servo loop.

14. The method of claim 10 wherein step (b) (1) causes the servo loop gain of the servo loop to change.

15. The method of claim 14 wherein step (b) (1) causes a resonance of the servo loop to shift from a first frequency to a second frequency.

16. The method of claim 14 wherein step (b) (1) causes the servo loop gain at a resonant frequency to decrease.

17. The method of claim 10 wherein the disc drive is qualified as part of a design process for designing disc drives.

18. The method of claim 10 wherein the disc drive is qualified as part of a manufacturing process for manufacturing disc drives.

19. A system for testing disc drives having servo loops, the system comprising:
    a servo interface coupled to a portion of the servo loop and capable of passing electrical signals to the servo loop; and
    servo loop testing means, coupled to the servo interface for performing servo loop tests.

* * * * *